(No Model.)
2 Sheets—Sheet 1.

W. H. KITTO.
VELOCIPEDE.

No. 405,363. Patented June 18, 1889.

WITNESSES:
Edward C. Hammond.
Arthur M. Flack.

INVENTOR:
William Henry Kitto.
By his Attorney.
Robt. E. d. Phillips.

(No Model.) 2 Sheets—Sheet 2.
W. H. KITTO.
VELOCIPEDE.
No. 405,363. Patented June 18, 1889.
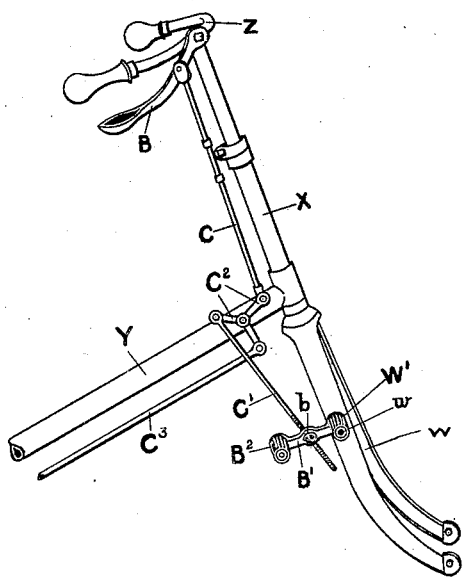
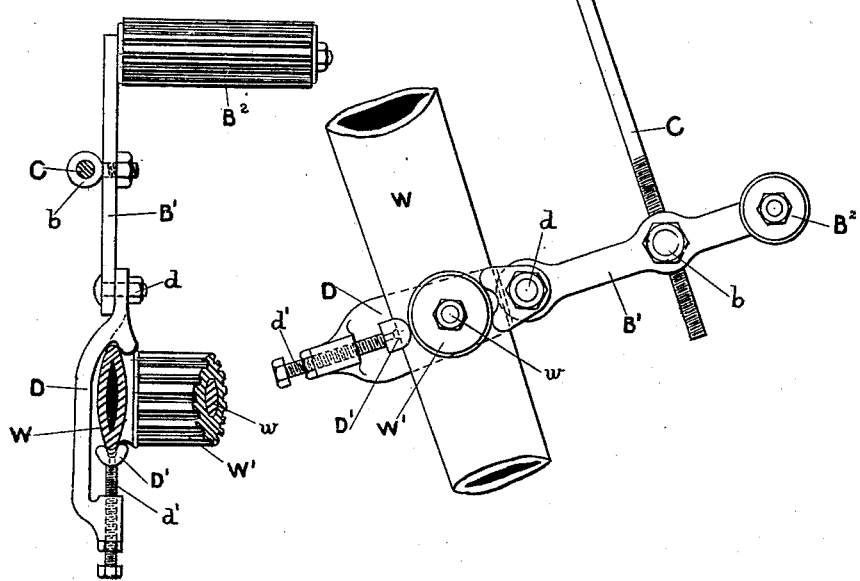
WITNESSES:
Edward C. Hammond
Arthur M. Slack
INVENTOR:
William Henry Kitto
By his Attorney
Robert D. Phillips

UNITED STATES PATENT OFFICE.

WILLIAM HENRY KITTO, OF PLYMOUTH, COUNTY OF DEVON, ENGLAND.

VELOCIPEDE.

SPECIFICATION forming part of Letters Patent No. 405,363, dated June 18, 1889.

Application filed February 6, 1889. Serial No. 298,923. (No model.) Patented in England July 26, 1888, No. 10,816.

*To all whom it may concern:*

Be it known that I, WILLIAM HENRY KITTO, a subject of the Queen of Great Britain, residing at Plymouth, in the county of Devon, England, have invented a certain new and useful Improvement in Velocipedes, (for which I have obtained Letters Patent in Great Britain, No. 10,816, dated July 26, 1888,) of which the following is a specification.

My invention relates to improvements in the brake mechanism of velocipedes, in which the brake is operated by a hand-lever fulcrated on the transverse steering handle-bar; and the objects of my improvement are, first, to relieve the hand operating the hand-lever of the brake of the severe strain thrown upon it, and, secondly, to increase the efficiency of the brake by bringing greater power to bear on it. I attain these objects by the mechanism illustrated in the accompanying drawings, throughout the several views of which similar parts are marked with like letters of reference.

Figure 1:
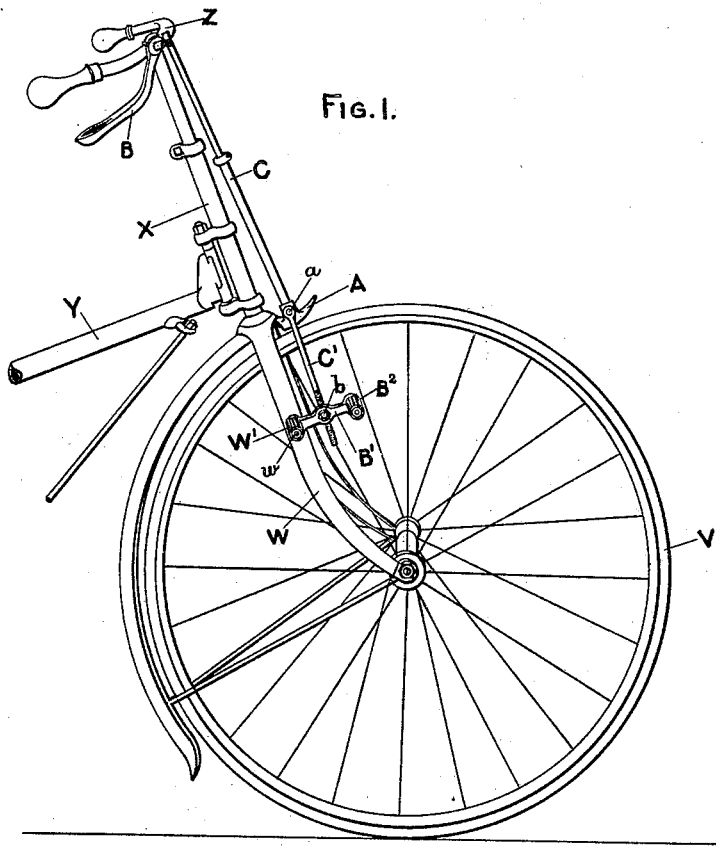

Figure 1, Sheet No. 1, is a view in side elevation of the steering-wheel of a front-steering bicycle or tricycle having a spoon-brake acting on the front wheel and fitted with my invention. V designates the steering-wheel mounted in a fork W, extending upward as a steering-post X to carry the head or socket to connect the backbone Y, and to carry the transverse handle-bar Z, all constructed, arranged, and operating in the well-known manner. A spoon-brake consisting of a brake-spoon lever A, pivoted to the crown of the fork W, a hand-lever B, fulcrated on the handle-bar Z, and a connecting rod or lever C, connecting the brake-spoon lever A with the hand-lever B, is also arranged to operate in the well-known manner. So far no novel features are presented. Onto the pin $w$, fixed to the side of the fork W to carry the foot-rest W', is pivoted a lever B', carrying at its free end a rubber-clothed bar B². To the brake-spoon lever A is pivoted by the pin $a$, that connects the said spoon-lever to the connecting rod or lever C, a rod C', shaped to clear the periphery of the wheel V, and threaded at its free end to engage with a swiveling nut $b$, mounted on the foot-lever B', and so connect the said foot-lever with the brake-spoon. By forming a screw-connection between the rod C and the foot-lever B' the position of the foot-lever may be varied as desired, and in applying this device to existing types of machines it also provides a means of adapting the device to the various positions in which the foot-rests are placed. If desired, any other suitable manner of varying the effective length of the rod C' and of connecting it to the brake-spoon A may be adopted.

Figure 2:
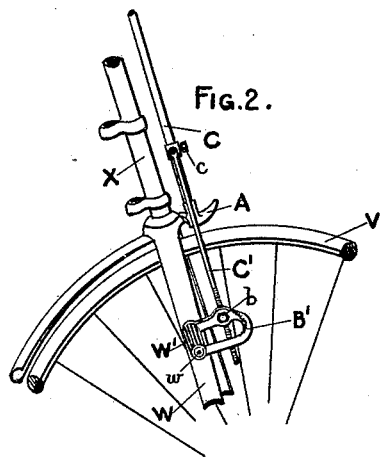

Fig. 2, Sheet No. 1, is a view in side elevation showing a modification of my device more specially adapted for fitting to machines already constructed, of which the types are innumerable. In this case a double stirrup foot-lever B' replaces the single foot-lever B', as illustrated by Fig. 1, Sheet No. 1. This stirrup-lever, having a bearing on each end of the foot-rest pin $w$, gives a steady fulcrum and avoids all chance of the lever being bent inward, so as to catch the spokes of the wheel. The top end of the connecting-rod C' is also modified in shape to allow it to be fixed to the rod C in any convenient position by means of the set-screw $c$, as illustrated.

Figure 3:
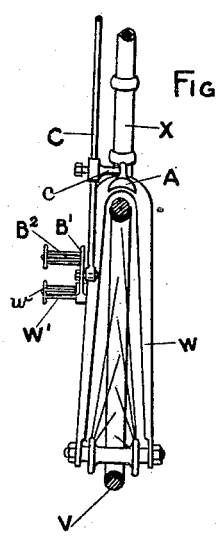

Fig. 3, Sheet No. 1, is a view in front elevation showing another modification more specially adapted for fitting to machines during construction. In this case the connecting-rod C extends direct from the hand-lever B to the foot-lever B'. A finger $c$, adjustably mounted on the said rod, engages with the spoon-lever A, and so imparts motion to it either from the hand-lever or foot-lever, or from both synchronously.

Fig. 4, Sheet No. 2, is a view in side elevation showing a modification of my invention for use with a spoon or drum brake acting on the driving wheel or wheels. The rod C' is coupled indirectly to the rod C through the compound bell-crank C², which reverses the direction of the motion of the rod C in imparting motion to the rod C³, running rearward to the brake acting on the driving wheel or wheels. In this arrangement the foot-lever B' is adapted to place the foot-bar B² in the rear of the foot-rest W'. When desired, this arrangement may also be used with a spoon-brake acting on the steering-wheel, as illustrated by Fig. 1, Sheet No. 1, either by shaping the rod C' to carry it to the rear of the foot-rest or by carrying out a pivot in front of the fork to place the fulcrum of the foot-lever in advance of the connection of the rod C' therewith and the foot-bar B² in the rear of the foot-rest W.

Figs. 5 and 6, Sheet No. 2, are views in side elevation and plan, respectively, on an enlarged scale, showing a method of attaching my device to the fork of any machine without any drilling or machine-work. The lever B' is pivoted by a pin $d$ to a bracket D, shaped to fit onto the fork W, and adapted to be clamped thereto by the screw $d'$ and clamp-piece D', as illustrated. By extending the bracket D to carry the pivot $d$ farther forward the foot-lever may be reversed to bring the foot-bar in the rear of the foot-rest, as hereinbefore described.

It will be obvious that foot-levers connected with the brake may be mounted on both sides of the fork W, carrying the steering-wheel V, if desired, to allow either or both feet to assist in operating the brake.

What I claim is—

1. In a velocipede, the combination, with a pivoted brake-lever for bearing against the wheel-tire, of a bracket clamped to the fork of the machine, a foot-lever pivoted to the said bracket, and a rod pivoted to the foot-lever and operatively connected with the said brake-lever, substantially as and for the purpose set forth.

2. In a velocipede, the combination, with the pivoted brake-lever, of a foot-lever pivoted to the fork of the machine, a hand-lever pivoted to the steering handle-bar, and rods pivoted to the said hand and foot levers, respectively, and operatively connected with each other and with the said brake-lever, substantially as and for the purpose set forth.

In witness whereof I have hereunto signed my name in the presence of two subscribing witnesses.

WILLIAM HENRY KITTO.

Witnesses:
JOHN KNEEBONE,
*Accountant, Plymouth.*
WM. OLIVER HOSKINS,
*Auctioneer, Plymouth.*